(12) United States Patent
Gikas et al.

(10) Patent No.: US 7,017,121 B1
(45) Date of Patent: Mar. 21, 2006

(54) METHOD FOR VISUAL DISPLAY UNIT-BASED DEFINITION AND PARAMETRIZATION OF INTERFACES

(75) Inventors: Diamantis Gikas, Nürnberg (DE); Ralf Klose, Altdorf (DE); Thomas Jachmann, Nürnberg (DE); Elisabeth Heindl, Zirndorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/555,557

(22) PCT Filed: Nov. 27, 1998

(86) PCT No.: PCT/EP98/07660

§ 371 (c)(1),
(2), (4) Date: Aug. 4, 2000

(87) PCT Pub. No.: WO99/28799

PCT Pub. Date: Jun. 10, 1999

(30) Foreign Application Priority Data

Dec. 1, 1997 (EP) ................................ 97120988

(51) Int. Cl.
*G06F 3/00* (2006.01)

(52) U.S. Cl. ................... 715/804; 715/853; 715/771

(58) Field of Classification Search ........ 715/735–739, 715/762–765, 771, 804, 853, 769, 781, 784, 715/786, 788, 792, 810, 965–967; 345/762, 345/763, 765, 734, 853, 967

See application file for complete search history.

(56) References Cited

U.S. PATENT DOCUMENTS

| | | | | |
|---|---|---|---|---|
| 5,065,347 A | * | 11/1991 | Pajak et al. ................. | 345/835 |
| 5,168,441 A | * | 12/1992 | Onarheim et al. ........... | 700/17 |
| 5,335,320 A | * | 8/1994 | Iwata et al. ................. | 717/110 |
| 5,404,441 A | * | 4/1995 | Satoyama .................... | 345/762 |
| 5,420,977 A | * | 5/1995 | Sztipanovits et al. ....... | 345/853 |
| 5,485,600 A | * | 1/1996 | Joseph et al. ................ | 703/13 |
| 5,485,620 A | * | 1/1996 | Sadre et al. ................. | 717/162 |
| 5,491,795 A | * | 2/1996 | Beaudet et al. ............. | 345/804 |
| 5,592,603 A | * | 1/1997 | Arato et al. ................. | 345/762 |

(Continued)

FOREIGN PATENT DOCUMENTS

EP      0 477 760      4/1992

(Continued)

OTHER PUBLICATIONS

Vines, Rose. Mastering Internet Explorer 4's Active Desktop. 1997 http://www.geekgirls.com/windows_mastering_active_desktop.html and accompanying screenshot.*

(Continued)

*Primary Examiner*—Raymond J. Bayerl
*Assistant Examiner*—Dennis Bonshock
(74) *Attorney, Agent, or Firm*—Staas & Halsey LLP

(57) ABSTRACT

A method for visual display unit-based parameterization of interfaces of the software components of an automation system, the interface being a software interfaces having at least one interface parameter. The interface parameter is further characterized by at least one attribute. A display window is provided which can be divided horizontally or vertically, the hierarchical structure of the interface parameters of the respective software components of the automation system, which parameters can be selected using a movable cursor, being displayed in a first partial window, and the at least one attribute of the selected interface parameter being displayed in a second partial window.

8 Claims, 2 Drawing Sheets

U.S. PATENT DOCUMENTS

| | | | |
|---|---|---|---|
| 5,604,854 A * | 2/1997 | Glassey | 715/503 |
| 5,682,510 A * | 10/1997 | Zimmerman et al. | 345/843 |
| 5,689,662 A * | 11/1997 | Nakajima et al. | 345/765 |
| 5,879,162 A * | 3/1999 | Bergman | 434/118 |
| 6,046,742 A * | 4/2000 | Chari | 345/734 |
| 6,198,480 B1 * | 3/2001 | Cotugno et al. | 715/866 |
| 6,219,628 B1 * | 4/2001 | Kodosky et al. | 703/2 |
| 6,664,978 B1 * | 12/2003 | Kekic et al. | 715/733 |

FOREIGN PATENT DOCUMENTS

| | | |
|---|---|---|
| EP | 0 482 523 | 4/1992 |
| EP | 0 592 921 | 4/1994 |
| EP | 0 623 871 | 11/1994 |

OTHER PUBLICATIONS

Tips Windows 95: May/1997. http://cc1.jura.uni-sb.de/cc1-support/Tips/TipWorld/Win95/1997/Win95-Tips-9705.htm.*

Using OS/2, 1989, Que Corporation, ISBN 0-8022-375-8, United States of America XP002100979, pp. 435-458.

Ulrich Ottenburger, "Verbesserte Mensch-Maschine-Schnittstelle für die Prozeßführung in der Kraftwerkswarte", Energie & Automation, Nov. 1990.

* cited by examiner

METHOD FOR VISUAL DISPLAY UNIT-BASED DEFINITION AND PARAMETRIZATION OF INTERFACES

FIELD OF THE INVENTION

The present invention relates to a method for visual display unit-based definition and parametrization of interfaces of the software components of an industrial automation system.

BACKGROUND INFORMATION

In the course of the increasing modularization of software components, the organization of related data and operations in structures intended for this by the respective programming languages has acquired prominence as the standard. For the "'higher' programming languages", these structures are, on a lower level, the "procedures" or "functions", related procedures or functions in each case being combined, for example, in a module, and related modules possibly being combined in a "collection", and the modules or the possibly existing collections finally being combined into the executable application.

The data exchange between the described structures is carried out via predefined or predefinable interfaces. As an example, a function will be discussed which ascertains the weekday that corresponds to a preselected date. The date in question is to be transferred to this function as parameter, whereas the weekday corresponding this date is returned by the function as result. In this context, the definable or predefined interface, on one hand, makes the memory location available via which this data can be exchanged and, on the other hand, guarantees the consistency of the data, for example, by carrying out a type test which, in the presently discussed case, ensures that the function does not ascertain the supposed weekday corresponding to a text string transferred as parameter.

In the present case, thus, a memory location which is suitable for receiving a representation representing the date, as well as a further memory location which is suitable for receiving a representation of the weekend returned as result are required.

A basically comparable constellation is also found in automation projects, the specific software components being organized, for example, according to the process periphery to be controlled and/or monitored. The structures used in a programming language, for example, Step® 5 or Step® 7 (registered trademarks of SIEMENS AG), which is common for automation projects, are called function blocks or operation blocks. These blocks have interfaces, as well, via which they can be parameterized, via which specific actions can be occasioned, via which specific internal data of the block or process-related data can be interrogated, etc.

SUMMARY

An object of the present invention is to provide a particularly user-friendly method for visual display unit ("VDU")-based definition and parametrization of interfaces of the software components of an automation system.

For a method for VDU-based definition and parametrization of interfaces of the software components of an industrial automation system, the interface being a software interface having at least one interface parameter, the interface parameter being further characterized by at least one attribute, this object is achieved by making provision for display windows which can be divided vertically or horizontally. The hierarchical structure of the interface parameters of the respective software components of the automation system, which parameters can be selected using a movable cursor, is displayed in a first partial window of the display window, and the at least one attribute of the selected interface parameter is displayed in a second partial window of the display window.

If the attributes of the selected interface parameter or of the selected interface parameters are displayable and/or editable, a user-friendly representation of the parameters can be called up at all times, or the interface parameters can be edited directly on the screen at all times, respectively.

If the attributes have a name portion and a data portion, the name portion being used for identifying the attribute, and the data portion being scrollable horizontally if its graphical representation requires more space than that offered by the display window or the display unit, the allocation of data to the name portion is visible on the screen at all times provided that the graphical representation of the name portion is stationary.

If the name portion and the data portion are arranged in vertical columns arranged side by side or in horizontal rows arranged one below the other, respectively, the data portion possibly being divided into columns or rows of its own, name portion and data portion are displayed in a particularly clear manner.

If the sequence of the columns or of the rows of the data portion can be freely selected and, in particular also stored by the user, it is possible for the user to arrange, for example, the columns which are of interest to him in such a manner that they are visible on the screen at all times, i.e., without having, for example, to scroll the screen contents. If, in addition, the selected sequence is storable, as well, the user finds the previously selected and stored sequence again as soon as he brings up to the screen an interface parameter attribute which has once been organized according to the his desires. This method can be used for each container separately. That is, the number and the arrangement of the columns can be set for each container separately.

DETAILED DESCRIPTION

Figure 1:
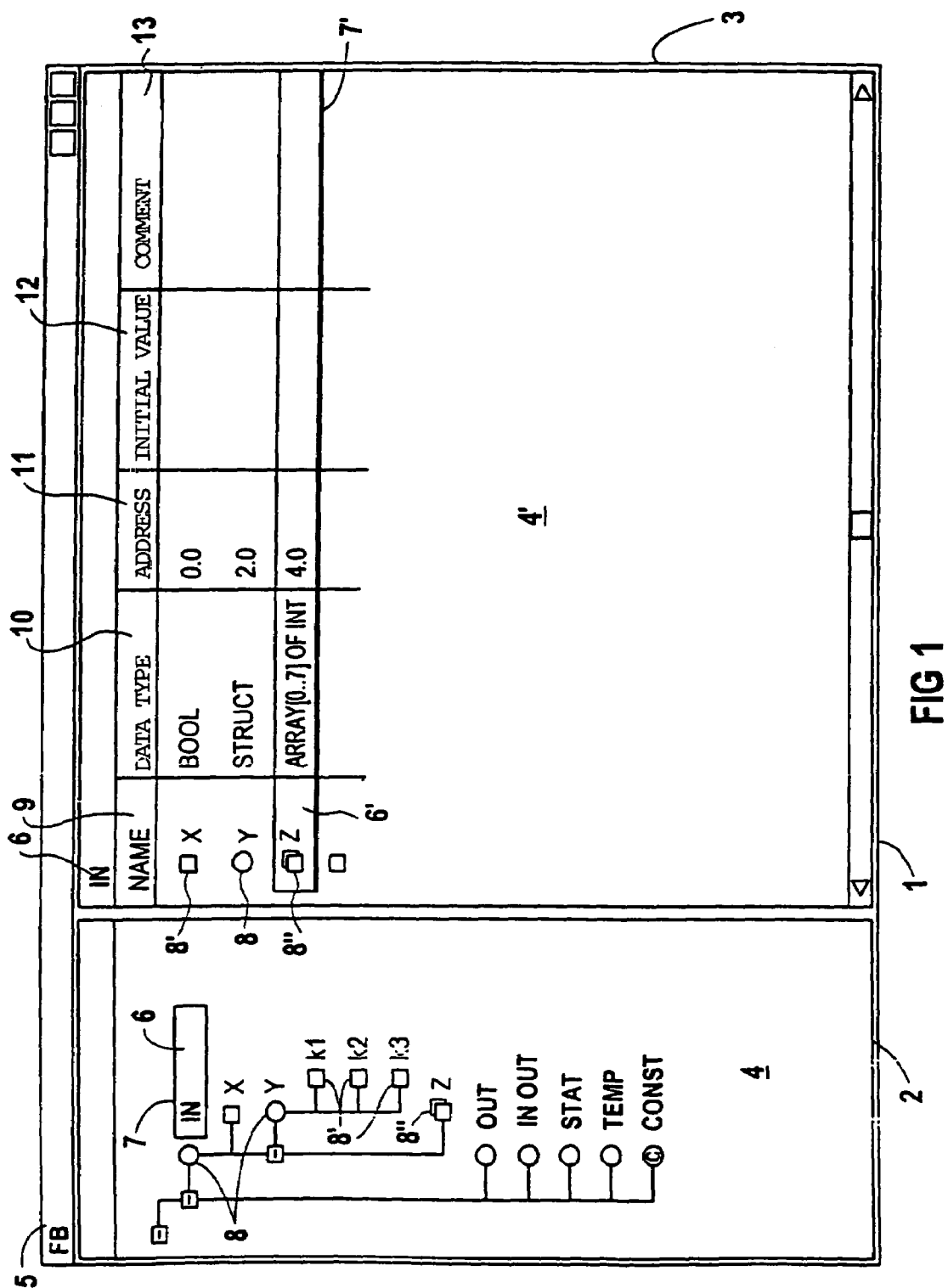
FIG. 1 shows a first screen display during use of a method for parameterizing a software interface according to the present invention.

FIG. 1 shows a screen display of vertically divided display window 1 which includes first partial window 2 and second partial window 3.

Shown in the left portion of display window 1 is first partial window 2 which depicts the hierarchical structure of software interface 4 of the specific software component 5, i.e., of a function block FB 5, of the automation system. The parameters of the software interface are selectable by a movable cursor 7, for example, by a cursor which is influenced by a movable input device such as a "mouse".

With respect to a selected interface parameter 6, a detail display 4' ensues in the right portion of display window 1, i.e., in second partial window 3, detail display 4' yielding a display which is adjusted to the type of selected interface parameter 6, and which is described further below. The textual designation of the hierarchical position of selected interface parameter 6 is displayed in the title line of second partial window 3 for identifying at all times the connection between the two representations 4, 4' of the software interface and of the selected window, respectively.

The VDU-based parametrization according to the present invention always relates to exactly one software component of the automation system. This software component is, for example, the currently processed software component, the method according to the present invention being initiatable, for example, by a special dialog during the processing of the software component. However, the interface to be parameterized can also be selected using a method in accordance with the method according to the present invention itself. This aspect of the present invention will be described further below, as well.

FIG. 1 shows an exemplary representation of interface 4, 4' of a function block FB 5, the interface including different data areas represented by corresponding structures.

Structures are basically combined, user-defined data types which, together with the access functions possibly defined for them, are designated as abstract data types, the combination of data types and access functions being designated as class or object. Here, the description is continued for the case that user-definable structures or predefined structures exist; however, the scope of the invention includes, of course, also the use of abstract data types, classes or objects. Today, the term container is frequently used as common generic term for the specified structures, as well.

Interface 4, 4' of function block FB 5 first of all includes a container by which data can be transferred to function block FB; this is the container which carries textual designation "IN" in FIG. 1. A analogously, provision is made for a container by which function block FB can output data to other software components of the automation system; in FIG. 1, this container carries textual designation "OUT". Moreover, a container is provided by which a bidirectional data transfer is implemented, i.e., data can both be transferred to function block FB and be output by function block FB; this container carries textual designation "INOUT". Provision is made for further containers for temporary files "TEMP", constant files "CONST", and for static data "STAT", respectively.

The described containers together form software interface 4 of function block FB. At the same time, these containers represent, in a way, the topmost hierarchical level of software interface 4 and cause the interface parameters to be divided into categories (data input, data output, temporary data, etc.).

If the containers exclusively cause the interface parameters to be grouped logically, the individual interface parameters being arranged in a quasi-parallel manner in the same hierarchical level, this results in that it is not required but not detrimental either to specify such a logical container (e.g., "TEMP") for identifying a variable located at any depth. In such a case, however, in the case of identically named interface parameters which are allocated to logically different containers, name conflicts arise which have to be considered.

Depending on the complexity of the data to be transferred via interface 4, the containers or their underlying structures can be specified, modified or complemented by the user according to his requirements.

For the data to be transferred to function block FB, this is depicted for the hierarchical level subordinate to container "IN".

In the exemplary representation according to FIG. 1, structure "IN" includes variables x, y, and z. Variable x is a variable of the boolean type and, consequently, a variable of a simple type whose value, validity range, or the like, can be represented directly, as in the case of other simple types such as integer, real, float, double, char, etc.

Variable y is a variable of a user-defined data type and, in the example depicted case, includes the three variables k1, k2, and k3 of the simple data type integer, thus representing a structure itself.

The structure of variable y is broken down more finely in first partial window 2 in the representation selected there only example.

Both in the case of tree-like representation 4 of the hierarchy in first partial window 2 and in second partial window 3 in the detail display 4' which is still to be described later, graphical symbols are used for indicating the specific entries. Thus, in first partial window 2, tree-like structure 4 of the individual hierarchical levels are always represented by corresponding horizontal and vertical lines, the branchings in the tree-like structure being marked by corresponding symbols 8, 8', 8".

In a practical implementation, symbols 8 can, in addition, differ from each other in that they are displayed differently, for example, by displaying an open folder if the branching marked by them is opened, and by displaying a closed folder as long as the branching is masked out.

Thus, the user can recognize directly from the displayed symbology 8 whether or not a selectable item can possibly be graphically expanded, i.e., whether or not it has a possibly displayable subtree.

Both graphical symbols 8, 8', 8" and the designations which are arranged in the screen display in a manner that they neighbor the symbols can be selected by a cursor.

In order not to increase unnecessarily the complexity of the representation in first partial window 2, provision is made for the number of displayed hierarchical levels to be selectable by the user, i.e., the user can chose which partial trees or branches he wants to be displayed and which not. In this context, the number of displayed hierarchical levels can be set individually, in particular for each branch. For that purpose, a selectable screen object is provided in the hierarchical representation for each branch, i.e., for a displayed structure, the screen object being selectable, for example, by the cursor, a subsequent key stroke displaying the objects, i.e., further structures or variables, which lie hierarchically below this object if they have not been shown before or suppressing the display, if they have been shown before.

A similar behavior is shown, for example, by the "Explorer" of Windows® 95 or Windows NT® (registered trademarks of Microsoft Corporation).

If the graphical symbol 8, 8', 8", or the designation of a container is selected, then this results in that the container or its underlying structure is expanded, and in that the components of the structure are displayed, as well. This happens both in the primarily graphical representation 4 in first partial window 2 and, in addition, in an textual representation 4' in partial window 3, as well.

In this context, partial window 3 is reserved for representing the specific contents of the component selected in partial window 2. If container "IN" is selected in first partial window 2, as exemplarily shown in FIG. 1, the contents of selected container 6, i.e., variable x, further structure y, and field z, are displayed in second partial window 3. If, in a next step, such as shown, for example, in FIG. 2, structure "y" 6 is selected in first partial window 2, then the contents of now selected structure 6, variables k1, k2, and k3 are displayed.

Only if in first partial window 2, a component is selected which cannot be expanded any more, i.e., a variable which, in a way, forms a leaf, i.e., a "terminal", of the tree-like structure, the structure which the originally selected variable belongs to is displayed in the second partial window, the selection marking in partial window 3 automatically changing to the selected terminal.

The described selection can be carried out in first partial window 2 in a particularly clear manner since the hierarchical dependencies are always represented in the form of a tree-like structure 4 so that, in particular, it is also possible to change from one branch to another without having to initially pass via the common connection hierarchically lying below.

In contrast to that, a selection progressing in the direction of lower hierarchical levels is possible in second partial window 3 (moreover, provision is made for the possibility to change to a higher-level container by a predefinable key, here the "backspace key", as well, provided that such a container exists). For example, in FIG. 1, container "IN" 6 is displayed like this in second partial window 3. From symbols 8, 8', 8" of from the likewise indicated data types, it is immediately obvious that variable x is a variable of a simple type and, consequently, cannot be expanded any more. Variables y and z, on the other hand, are expandable. The expansion is activated by selecting the corresponding entries and, for example, when selecting structure y, its components are displayed in second partial window 3, the previous display being replaced. However, it is also conceivable that, in the case of a selection in second partial window 3, the screen contents are not replaced but only covered up, for example, by an additionally opened screen window.

Thus, by positioning cursor 7' on the line in which variable y is displayed in second partial window 3 and a possibly following activation, for example, using the mouse button or by a key stroke, it is thus possible for structure y to be displayed in a detailed manner, such a selection immediately resulting in a corresponding positioning of cursor 7 onto structure y below container "IN" in first partial window 2.

Figure 2:
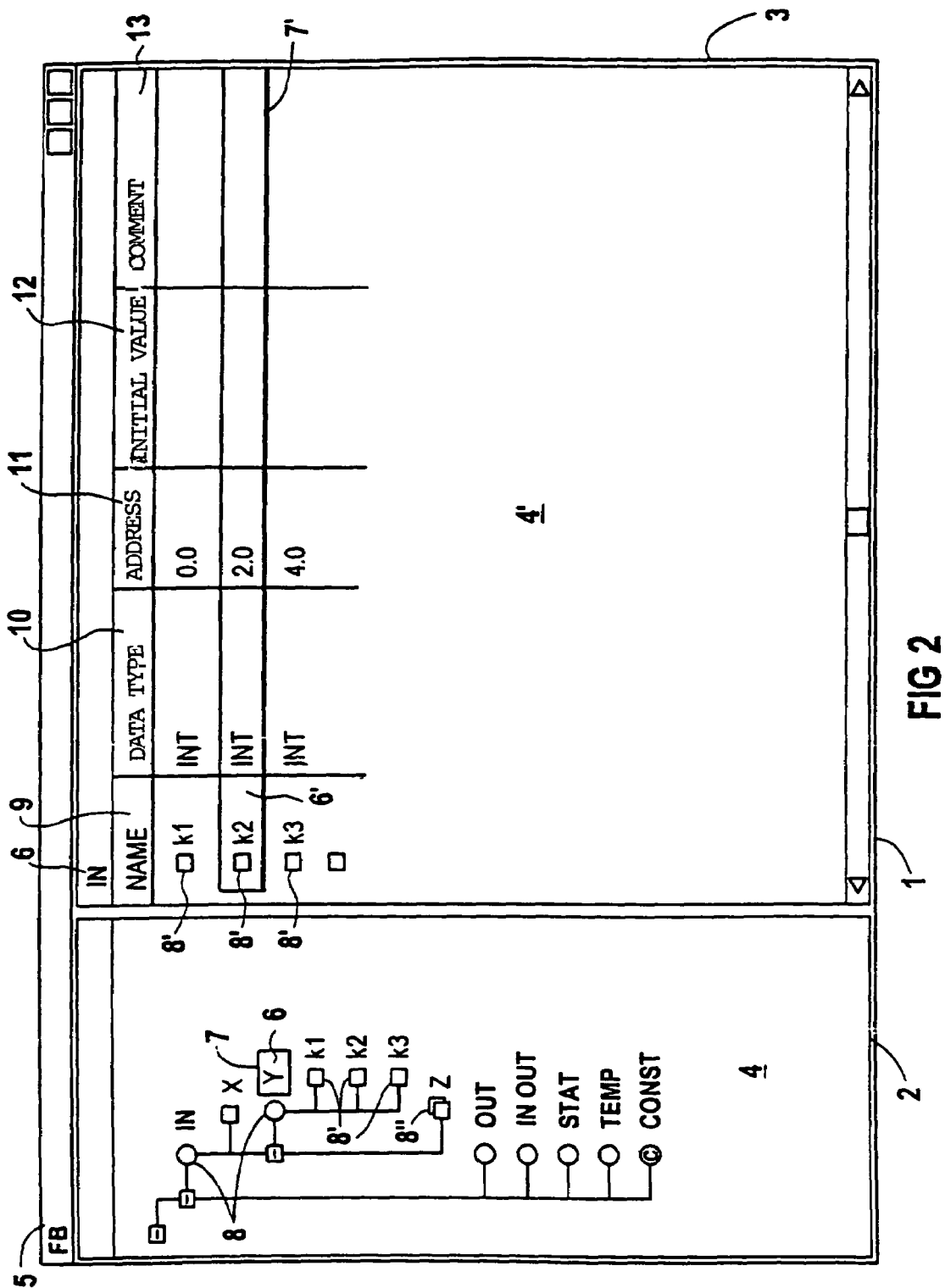
FIG. 2 shows a second screen display during use of the method for parameterizing a software interface according to the present invention.

FIG. 2 shows the conditions which ensue both in first and in second partial window 2, 3 in response to the selection of structure y which, in turn, hierarchically belongs to container "IN".

In detail display 4' in second partial window 3, variables k1, k2, and k3 are displayed as components of structure y, the attributes of the displayed interface parameters being displayed simultaneously. Moreover, the attributes of an interface parameter can possibly be edited, as well, provision being made for movable cursor 7' for selecting an interface parameter, the positioning of the movable cursor, in turn, being influenceable by an input device.

In FIG. 2, the contents of second partial window 3 differ from those of FIG. 1 in that the contents of variable y are now broken down, which is clear from entry 6 in the title line of second partial window 3, as well. In detail display 4' according to FIG. 2, the attributes of variables k1, k2, and k3, which together from structure y, are displayed particularly clearly in a table-like manner, it being possible for an initial value or a comment to be input for each variable separately, i.e., for example, only for k2. In the representation according to FIG. 1, a corresponding initial value or a comment would relate to structure y on the whole.

Besides the title line which indicates textual designation 6 of component 6 of software interface 4 from first partial window 2, component 6 being selected by cursor 7, second partial window 3 has in addition a number of vertical columns 9, 10, 11, 12, 13, etc., in which the attributes of the respective variables are represented, and whose number is the number of possible attributes so that possibly a plurality of columns results which, in particular, can no longer be displayed together on the screen or in second partial window 3. In this context, the names, i.e., the plain text designations of the in each case represented structures or variables are listed in a name column 9.

In FIG. 1, these are variables x, y, and z as components of structure "IN" or as contents of container "IN"; in FIG. 2, these are variables k1, k2, and k3 as components of structure y which, in turn, hierarchically belongs to container "IN". In columns 10, 11, 12, 13 adjoining name column 9 to the right in the representation according to FIG. 1 or to FIG. 2, respectively, further details, such as the data type and the address, characterizing the respective variable or structure are displayed in relation to the beginning of the structure which is in each case currently displayed in second partial window 3. However, the display can include, for example, details on ranges of validity, as well.

The order of columns 10, 11, 12, 13, etc. is changeable. For that, a dialog which can be inserted on the screen is provided for selecting columns to be displayed or to be masked out, respectively, the order in which columns 10, 11, 12, 13, etc. are displayed can possibly be defined, as well.

Alternatively, provision is made for the title area of respective column 10, 11, 12, 13, i.e., the area in which the plain text designation of the respective column is indicated, i.e., for example, the area with plain text designation "data type" for column 10 to be selectable, the position of respective column 10, 11, 12, 13 then being changeable using the "drag & drop" technique or by a "context menu" intended for this which can be activated, for example, by operating a mouse button.

In this manner, it is possible for columns having particularly high relevance to be positioned in such a manner that they are permanently displayed on the screen. This may be important especially when the dimension of second partial window 3 is not sufficient to display all columns 10, 11, 12, 13, etc, so that the screen contents of second partial window 3 must possibly be scrolled horizontally.

Thus, columns having low relevance can be displaced to a portion of the window which is possibly not visible, the contents of the columns being important only comparatively rarely, so that the user only rarely has to take the effort of scrolling the screen contents.

In order not to make more difficult for the user to relate the displayed information during the possibly required scrolling of the screen contents, provision is made for name column 9 to be stationary. This means the position of name column 9 is always retained during horizontal scrolling, as well, so that the user can always relate the data which is displayed in a line to the respective variable or structure, respectively, which can be recognized by the designation listed in name column 9 since this plain text designation is always found at the beginning of the line in name column 9 which is stationary there.

Thus, because a selection is made either by moving cursor 7 in first partial window 2 or by carrying out this selection by analogous actions or inputs in second partial window 3 using cursor 7', the structure of software interface 4, its layout, and its contents or a possibly defined validity range can be displayed, and specific data possibly be edited, as well.

Accordingly the method according to the present invention may be used for checking the software interface of a previously already selected block, the block having been selected previously, for example, by programming it, possibly using another software tool.

Additionally, according to the present invention, the block whose interface is checked may be selected from the set of blocks defined for a software application directly and, consequently, in a significantly more flexible manner.

Completely analogously to the hierarchical structures, dependencies or hierarchical structures of the blocks of a software application can, in fact, be displayed in a tree-like manner, as well, the root of the tree representing the application, i.e., the executable overall program, and the blocks forming the branches of the tree. Possibly, blocks belonging to one another, or the function blocks on one hand and the operation blocks on the other hand can in each case be combined in a common branch from which they then form branchings again, i.e., branches of their own.

The ends of the respective branches then form the interfaces appertaining to the block represented by the branch, the interfaces themselves representing expandable structures. In the end, the possibility of selecting arbitrary interfaces from the software application thus signifies the insertion of at least one additional hierarchical level.

Since the blocks of the software application have bi-unique designations, variables of deeply nested structures of a software interface of a specific block can be related to this block at all times if the designation of this block is carried along for identifying the variable.

While the complete designation of variable k2 as component of structure y which, in turn, hierarchically belongs to container "IN", can be represented as \IN\y\k2, this variable can be represented in a bi-unique manner for the entire software application if, in addition, the name of the specific block, for example, of function block FB10, is also carried along so that variable y can then can be represented as \FB10\IN\y\k2.

The invention claimed is:

1. A method for visual display unit-based definition and parameterization of a software interface of a software component of a function block of a software application of an industrial automation system, the software interface having at least one interface parameter that has at least one editable attribute, wherein at least one interface parameter has a bi-unique designation corresponding to the function block and a hierarchical structure, the method comprising:
    combining function blocks in a common branch to form combined functions having respective branches, wherein each end of the respective branches forms an interface appertaining to a block represented by a respective branch, enabling selection of arbitrary interfaces;
    providing a display window which can be divided vertically or horizontally;
    displaying in a first partial window of the display window the hierarchical structure of the at least one interface parameter and the function block of the bi-unique designation of the software component of the software application of the industrial automation system;
    selecting one interface parameter and the hierarchical structure using a movable cursor; and
    displaying in a second partial window of the display window a detailed display of the selected interface parameter, the detail display including a display of at least one editable attribute of the selected interface parameter and allowing the editable attribute to be defined and parameterized within the hierarchical structure of the function block;
    for each editable attribute of the at least one editable attribute, providing a name portion and a data portion, the name portion being used to identify the editable attribute, the data portion being scrollable horizontally if a graphical representation of the data portion requires more space than a space offered by the display window, the graphical representation of the name portion being stationary; and
    arranging the name portion and the data portion in horizontal rows, the horizontal rows being arranged one below another, wherein the position of the name portion is retained during horizontal scrolling.

2. The method according to claim 1, further comprising:
    arranging the name portion and the data portion in vertical columns, the vertical columns being arranged side by side.

3. The method according to claim 2, wherein a sequence of the vertical columns is freely selected and stored by a user.

4. The method according to claim 1, further comprising:
    dividing the data portion into columns or rows.

5. The method according to claim 1, wherein a sequence of the horizontal rows is freely selected and stored by a user.

6. A method for visual display unit-based definition and parameterization of a software interface of a software component of an industrial automation system, the software interface having at least one interface parameter that has at least one editable attribute, the method comprising:
    combining function blocks in a common branch to form combined functions having respective branches, wherein each end of the respective branches forms an interface appertaining to a block represented by a respective branch, enabling selection of arbitrary interfaces;
    providing a display window which can be divided vertically or horizontally;
    displaying in a first partial window of the display window a hierarchical structure of the at least one interface parameter of the software component of the industrial automation system, wherein the at least one interface parameter determines use of a function block of the software interface;
    selecting one interface parameter using a movable cursor;
    displaying in a second partial window of the display window a detail display of the selected interface parameter, the detail display including a display of at least one editable attribute of the selected interface parameter and allowing the editable attribute to be defined and parameterized;
    for each editable attribute of the at least one editable attribute, providing a name portion and a data portion, the name portion being used to identify the editable attribute, the data portion being scrollable horizontally if a graphical representation of the data portion requires more space than a space offered by the display window, the graphical representation of the name portion being stationary; and
    arranging the name portion and the data portion in horizontal rows, the horizontal rows being arranged one below another, wherein the position of the name portion is retained during horizontal scrolling.

7. A software interface of a function block of a software application of an industrial automation system, the software interface having at least one interface parameter that has at least one editable attribute, wherein at least one interface parameter has a bi-unique designation corresponding to the function block and a hierarchical structure, the software interface comprising computer-readable instructions, executed on a computer readable medium for performing;

combining function blocks in a common branch to form combined functions having respective branches, wherein each end of the respective branches forms an interface appertaining to a block represented by a respective branch, enabling selection of arbitrary interfaces;

providing a display window which can be divided vertically or horizontally;

displaying in a first partial window of the display window the hierarchical structure of the at least one interface parameter and the function block of the bi-unique designation of the software component of the software application of the industrial automation system;

selecting one interface parameter and the hierarchical structure using a movable cursor; and displaying in a second partial window of the display window a detailed display of the selected interface parameter, the detail display including a display of at least one editable attribute of the selected interface parameter and allowing the editable attribute to be defined and parameterized within the hierarchical structure of the function block;

for each editable attribute of the at least one editable attribute, providing a name portion and a data portion, the name portion being used to identify the editable attribute, the data portion being scrollable horizontally if a graphical representation of the data portion requires more space than a space offered by the display window, the graphical representation of the name portion being stationary; and arranging the name portion and the data portion in horizontal rows, the horizontal rows being arranged one below another, wherein the position of the name portion is retained during horizontal scrolling.

8. A method for visual display unit-based definition and parameterization of a software interface of a software component of a function block of a software application of an industrial automation system, the software interface having at least one editable interface parameter that includes a bi-unique designation corresponding to the function block and a hierarchical structure, the method comprising:

combining function blocks in a common branch to form combined functions having respective branches, wherein each end of the respective branches forms an interface appertaining to a block represented by a respective branch, enabling selection of arbitrary interfaces;

providing a display window which can be divided vertically or horizontally;

displaying in a first partial window of the display window the hierarchical structure of the at least one editable interface parameter and the function block of the bi-unique designation of the software component of the software application of the industrial automation system; and selecting and displaying one editable interface parameter of the function block and the hierarchical structure, wherein the editable interface has at least one editable attribute with a stationary name portion and a horizontally scrollable data portion.

\* \* \* \* \*